United States Patent
Naveh et al.

(10) Patent No.: US 7,451,333 B2
(45) Date of Patent: Nov. 11, 2008

(54) COORDINATING IDLE STATE TRANSITIONS IN MULTI-CORE PROCESSORS

(75) Inventors: Alon Naveh, Ramat Hasharon (IL); Abraham Avi Mendelson, Haifa (IL); Ittai Anati, Haifa (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 10/934,034

(22) Filed: Sep. 3, 2004

(65) Prior Publication Data

US 2006/0053326 A1    Mar. 9, 2006

(51) Int. Cl.
   *G06F 1/32* (2006.01)
(52) U.S. Cl. ............................................. 713/323
(58) Field of Classification Search ................ 713/323
   See application file for complete search history.

(56) References Cited

U.S. PATENT DOCUMENTS

| | | | |
|---|---|---|---|
| 5,307,003 | A | 4/1994 | Fairbanks et al. |
| 5,502,838 | A | 3/1996 | Kikinis |
| 5,526,487 | A | 6/1996 | Schiffleger |
| 5,592,671 | A | 1/1997 | Hirayama |
| 5,627,412 | A | 5/1997 | Beard |
| 5,745,375 | A | 4/1998 | Reinhardt et al. |
| 5,787,294 | A | 7/1998 | Evoy |
| 5,812,860 | A | 9/1998 | Horden et al. |
| 5,862,368 | A | 1/1999 | Miller et al. |
| 5,918,061 | A | 6/1999 | Nikjou |
| 5,953,685 | A | 9/1999 | Bogin et al. |
| 6,047,248 | A | 4/2000 | Georgiou et al. |
| 6,363,490 | B1 | 3/2002 | Senyk |
| 6,415,388 | B1 | 7/2002 | Browning et al. |
| 6,711,691 | B1 * | 3/2004 | Howard et al. ............. 713/300 |
| 6,714,891 | B2 | 3/2004 | Dendinger |
| 6,804,790 | B2 * | 10/2004 | Rhee et al. .................. 713/320 |
| 6,885,233 | B2 | 4/2005 | Huard et al. |
| 6,983,386 | B2 | 1/2006 | Barr |
| 7,043,405 | B2 * | 5/2006 | Orenstien et al. ........... 702/188 |
| 7,043,649 | B2 | 5/2006 | Terrell, II |
| 7,134,031 | B2 | 11/2006 | Flautner |
| 2002/0083356 | A1 | 6/2002 | Dai |

(Continued)

FOREIGN PATENT DOCUMENTS

EP    0978781    7/1999

(Continued)

OTHER PUBLICATIONS

U.S. Appl. No. 10/272,149, filed Oct. 14, 2002; Inventor: Alon Naveh.

(Continued)

*Primary Examiner*—Rehana Perveen
*Assistant Examiner*—Eric Chang
(74) *Attorney, Agent, or Firm*—Blakely, Sokoloff, Taylor & Zafman LLP (57) ABSTRACT

Systems and methods of managing processors provide for detecting a command at a core of a processor having a plurality of cores, where the command requests a transition of the core to an idle state. Power consumption of the core is managed based on the command and an idle state status of each of the plurality of cores.

29 Claims, 5 Drawing Sheets

U.S. PATENT DOCUMENTS

2004/0098631 A1    5/2004    Terrell, II

FOREIGN PATENT DOCUMENTS

| EP | 1 286 248 A2 | 2/2006 |
|---|---|---|
| WO | WO-01/35200 | 5/2001 |
| WO | WO-02/17052 | 2/2002 |

OTHER PUBLICATIONS

U.S. Appl. No. 11/208,935, filed Aug. 22, 2005; Inventor: Julius Mandelblat.
U.S. Appl. No. 11/323,259, filed Dec. 30, 2005; Inventor: Sanjeev Jahagirdar.
U.S. Appl. No. 10/899,674, filed Jul. 27, 2004; Inventor: Alon Naveh.
U.S. Appl. No. 11/323,254, filed Dec. 30, 2005; Inventor: Sanjeev Jahagirdar.
Int'l Application No. PCT/US2005/028699 Int'l Search Report & Written Opinion dated May 8, 2006.
Invitation to Pay Additional Fees and Annex (partial International Search) from PCT/US2005/028699, mailed Mar. 2, 2006, 10 pages.
Non-Final Office Action, Jun. 16, 2005, 13 pgs, Inventor Alon Naveh, Filing Date Oct. 14, 2002.
Non-Final Office Action, Mar. 19, 2007, 18 pgs, Inventor Alon Naveh, Filing Date Jul. 27, 2004.
"42P15271 Notice of Allowance Mailed Jan. 5, 2006 for U.S. Appl. No. 10/272,149", (Jan. 5, 2006), Whole Document.
"42P19740 OA Mailed Oct. 4, 2007 for U.S. Appl. No. 10/899,674", (Oct. 4, 2007), Whole Document.

* cited by examiner

COORDINATING IDLE STATE TRANSITIONS IN MULTI-CORE PROCESSORS

BACKGROUND

1. Technical Field

One or more embodiments of the present invention generally relate to power management. In particular, certain embodiments relate to managing power consumption in multi-core processors.

2. Discussion

As the trend toward advanced central processing units (CPUs) with more transistors and higher frequencies continues to grow, computer designers and manufacturers are often faced with corresponding increases in power and energy consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life. Because batteries typically have a limited capacity, running the processor of a mobile computing system more than necessary could drain the capacity more quickly than desired.

Some modern mobile computing systems attempt to conserve power by placing the processor in various power/idle states when there are no instructions to be executed. It should be noted, however, that these solutions are typically tailored for single core processors. As a result, traditional approaches only need to consider the status of a single core when managing power and making power state transition determinations. In addition, it is common for power management to be implemented at the operating system (OS) level, which may be too slow as processor architectures become more complex.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
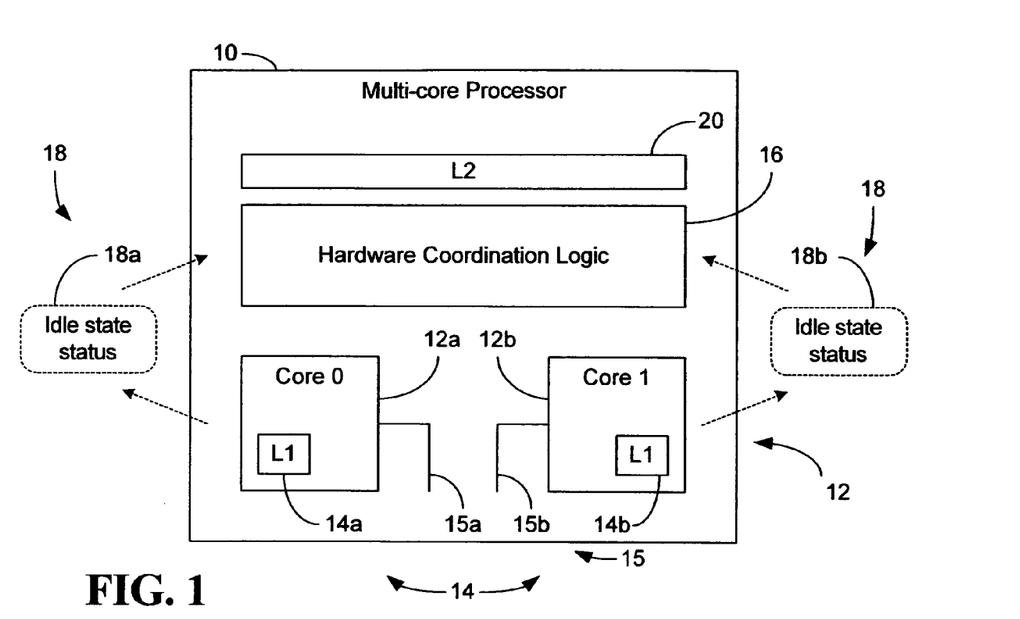
FIG. 1 is a block diagram of an example of a multi-core processor according to one embodiment of the invention.

FIG. 1 shows a processor 10 having a plurality of cores 12 (12a-12b), where each core 12 is fully functional with instruction fetch units, instruction decoders, level one (L1) cache 14 (14a-14b), execution units, and so on. While the illustrated processor 10 has two cores 12, the embodiments of the invention are not so limited. Indeed, the techniques described herein can be useful for any multi-core architecture for which power consumption is an issue of concern. Thus, any number of cores may be used without parting from the spirit and scope of the embodiments described herein.

Each core 12 is able to detect a command that requests a transition of the core 12 to an idle state. The command may originate internally within the core 12 or external to the core 12. The idle state could be a processor power state such as one of the "C-states" described in the Advanced Configuration Power Interface (ACPI, Ver. x285, June 2004) Specification. Generally, deeper idle states are associated with lower power consumption and longer exit latency. The following table demonstrates one approach to specifying C-state latencies. Other approaches may also be used.

TABLE I

| Field | Byte Length | Byte Offset | Description |
|---|---|---|---|
| P_LVL2_LAT | 2 | 96 | The worst-case hardware latency, in microseconds, to enter and exit a C2 state. A value >100 indicates the system does not support a C2 state. |
| P_LVL3_LAT | 2 | 98 | The worst-case hardware latency, in microseconds, to enter and exit a C3 state. A value >1000 indicates the system does not support a C3 state. |

The processor 10 can have a level two (L2) cache 20 that is shared by the cores 12. The L1 caches 14, on the other hand, may be dedicated to their respective cores 12. As will be discussed in greater detail below, the dedicated nature of the L1 caches 14 provides an opportunity for per-core power management. The cores 12 also have dedicated clock inputs 15 (15a-15b) that can be gated to obtain power savings on a per core basis. Hardware coordination logic 16 can manage power consumption of a given core 12 based on the command and an idle state status 18 (18a-18b) of each of the plurality of cores 12. By coordinating multiple cores 12 and multiple idle state statuses 18, the illustrated processor 10 is able to support more complex architectures and can respond more quickly to condition changes than traditional software approaches. The illustrated processor 10 can also use the coordination logic 16 to initiate power saving features in advance of actual power state transitions. The result can be significant power savings.

For example, it might be determined that, based on a lack of utilization, the C4 state is appropriate for the first core 12a. The C4 state, which is deep in relation to the other C-states, is typically associated with a shared resource such as a package-wide voltage and/or frequency setting. The second core 12b, on the other hand, may be in an active state. Under such conditions, the coordination logic 16 could transition the first core to a "tentative" state that involves the initiation of certain dedicated power saving features so that the first core 12a is still able to conserve power. Furthermore, if the second core 12b subsequently receives a request to transition to the C4 state, the coordination logic 16 can also initiate shared power saving features to conserve more power while the cores 12 are being transitioned into the C4 state. Similar advantages can be achieved for the other idle states by detecting when all cores are transitioning to the same state.

Figure 2:
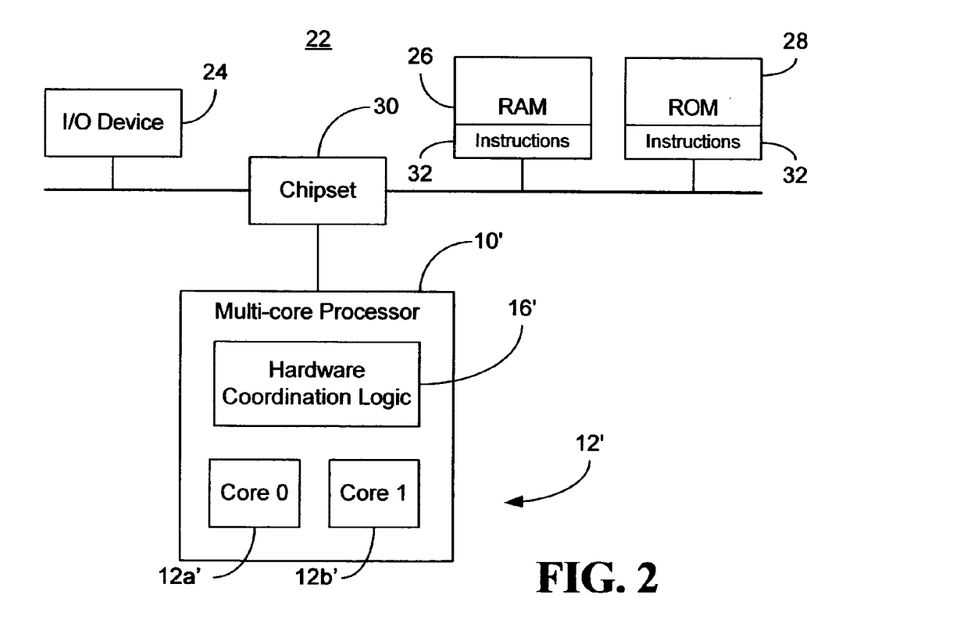
FIG. 2 is a block diagram of an example of a computing system according to one embodiment of the invention.

FIG. 2 shows a system 22 having a processor 10' with a plurality of cores 12' (12a'-12b') and hardware coordination logic 16' as already described. The illustrated system 22 also includes one or more input/output (I/O) devices 24, a random access memory (RAM) 26 and a read only memory (ROM) 28 coupled to the processor 10' by way of a chipset 30. The RAM 26 and ROM 28 store instructions 32 that can be executed as one or more threads and/or processes by the cores 12', where execution of the instructions 32 can lead to increased power consumption. As idle state transition commands are received by the cores 12' from the chipset 30 and/or operating system (OS), the hardware coordination logic 16' is able to substantially reduce power consumption for the system 22.

Figure 3:
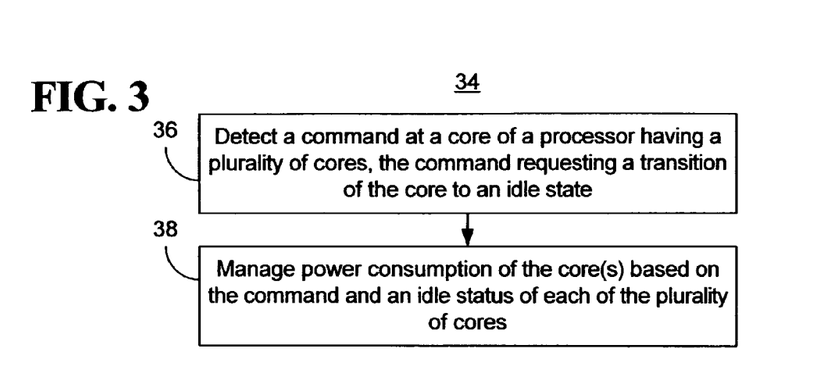
FIG. 3 is a flowchart of an example of a method of managing core idle power according to one embodiment of the invention.

Turning now to FIG. 3, a method 34 of managing core idle power is shown. The method 34 may be implemented using any combination of hardware and/or software programming techniques. For example, the method 34 may be implemented in a reduced instruction set computer (RISC) multi-core processor as fixed functionality hardware, microcode, or any combination thereof. In particular, processing block 36 provides for detecting a command at a core of a processor having a plurality of cores. The command can request a transition of the core to an idle state. Power consumption of the core is managed at block 38 based on the command and an idle state status of each of the plurality of cores. Thus, the status of one core can be taken into consideration when managing the idle power of another core.

Figure 4:
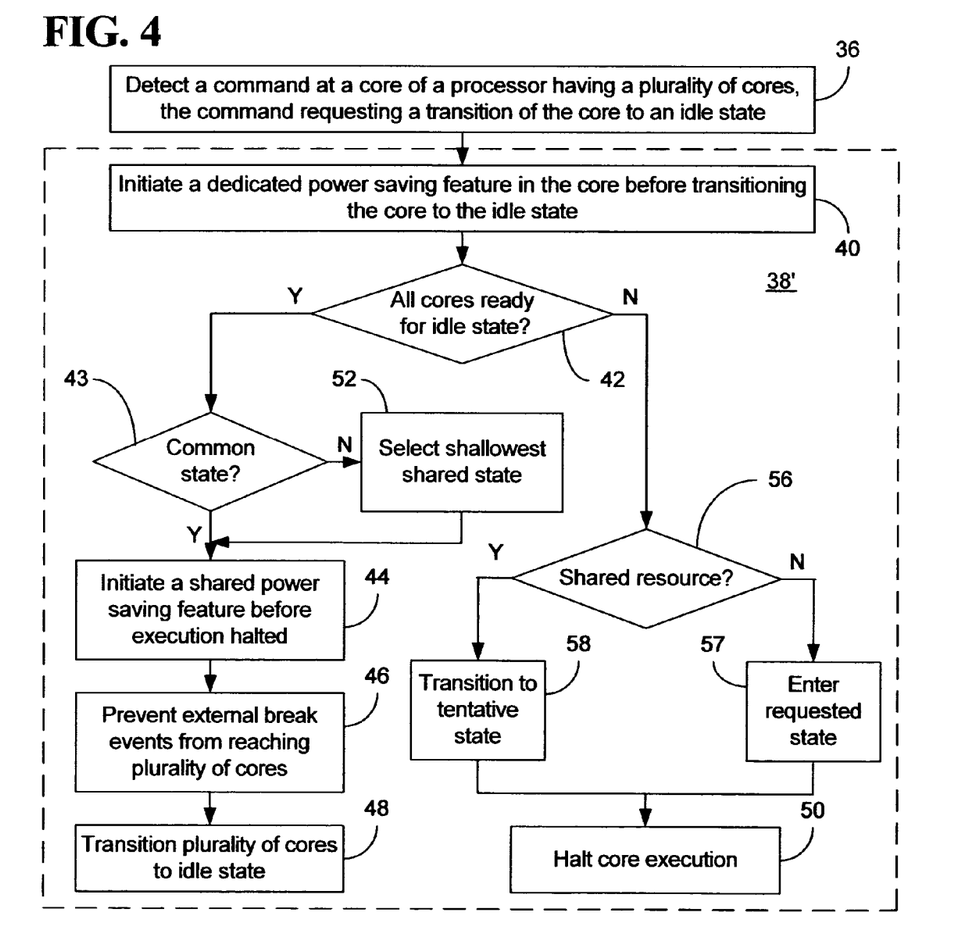
FIG. 4 is a flowchart of an example of a process of managing power consumption according to one embodiment of the invention.

FIG. 4 shows one approach to managing power consumption in greater detail at block 38'. The illustrated block 40 provides for initiating a dedicated power saving feature in the core before transitioning the core to the idle state. Such an approach enables the core to enter a state that is equivalent to the idle state and may enable the core to achieve power savings above and beyond those provided by the idle state itself. For example, if the requested idle state is generally associated with a gating of a dedicated clock, block 40 can incorporate such a feature. Block 42 provides for determining whether each of the plurality of cores is ready to enter an idle state (i.e., none of the plurality of cores is active). If so, block 43 provides for determining whether each of the plurality of cores has detected a command requesting a transition to a common (i.e., the same) idle state.

If all of the cores are not transitioning to the same idle state, the shallowest state among the plurality of cores is selected as the idle state at block 52. Thus, if the first core is in a C2 equivalent state (i.e., "CC2" state) and the second core is in a C3 equivalent state (i.e., "CC3" state), the shallowest state would be the C2/CC2 equivalent state. The chipset therefore experiences a unified interface to the processor although the processor may be experiencing multiple different idle states internally. Such an approach represents a significant departure from conventional single core and multi-processor architectures. Once the appropriate idle state has been identified, a shared power saving feature is initiated at block 44. It should be noted that transitioning to the idle state typically involves gating the clocks and halting execution. The power saving features initiated at blocks 40 and 44, however, are implemented while clocks are available and the core(s) are still running. This technique can provide substantial advantages over conventional approaches.

External break events such as interrupts, exceptions and monitor events are prevented from reaching the plurality of cores at block 46, while the shared state entry procedure is in progress. Break events can be inhibited in a variety of ways. For example, one approach would be to provide for a special interface into each of the cores' break logic. Another approach would be to physically separate the cores from all break sources. If a break event is detected after the shared state is reached, the shared state is exited. Such an exit can be achieved in a number of ways. For example, the chipset could detect the break event and/or initiate the exit sequence or logic could be provided within the processor to detect the break event and/or initiate the exit sequence. When the multi-core processor exits the idle state, inhibiting of external break events can be discontinued. Block 48 provides for transitioning the plurality of cores to the idle state. Transitioning the cores to the idle state can involve issuing a signal such as a read transaction, specialized bus message or sideband signal to the chipset. For example, one approach is to initiate a well documented handshake sequence with the chipset in which sleep (i.e., SLP), deep sleep (i.e., DPSLP) and deeper sleep (i.e., DPRSLP) state signals are transferred between the processor and the chipset.

If it is determined at block 42 that one or more of the plurality of cores is active, block 56 provides for determining whether the idle state is associated with a resource that is shared by the plurality of cores. As already noted, the shared resource might be a frequency and/or core voltage setting. An example of such a state could be the C4 state. If the idle state is associated with a shared resource, the core is transitioned to a tentative state at block 58 until each of the plurality of cores has detected a command requesting a transition to the idle state. Otherwise, the core can be transitioned to the requested state at block 57. Block 50 provides for halting execution of the core.

Figure 5A:
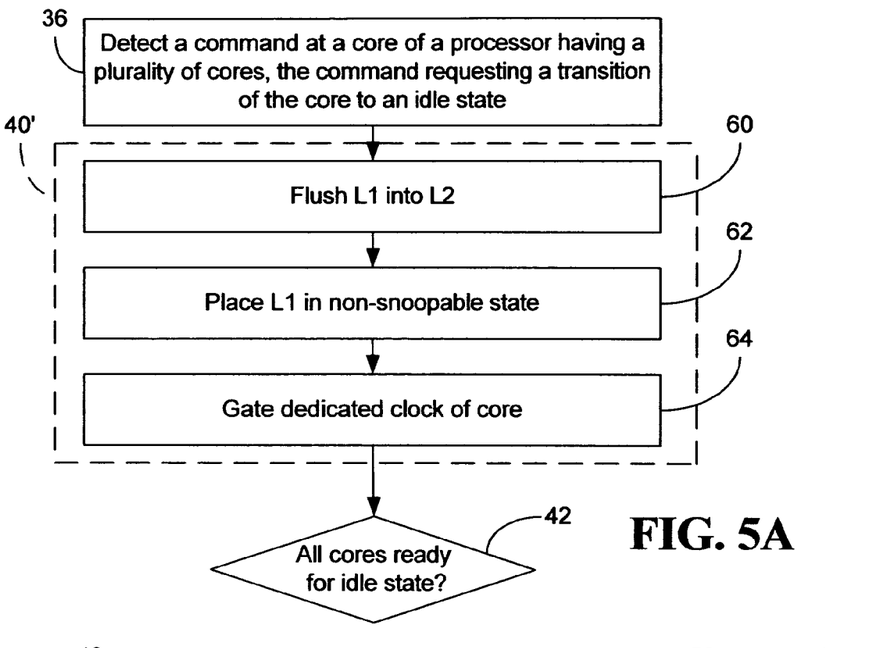
FIG. 5A is a flowchart of an example of a process of initiating dedicated power saving features according to one embodiment of the invention.
Figure 5B:
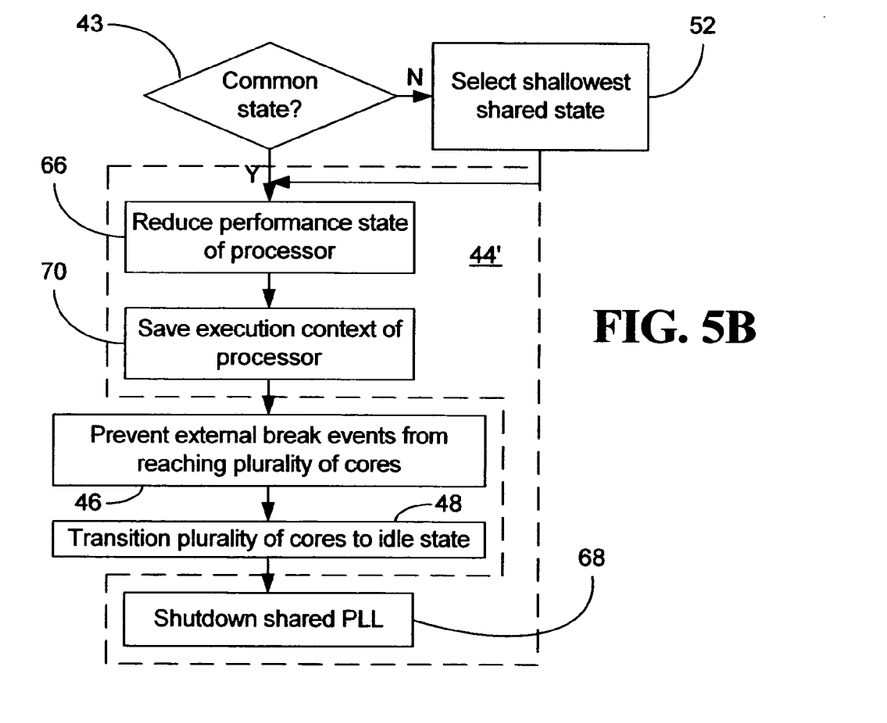
FIG. 5B is a flowchart of an example of a process of initiation shared power saving features according to one embodiment of the invention.

Turning now to FIGS. 5A and 5B, approaches to initiating dedicated and shared power saving features are shown in greater detail at blocks 40' and 44', respectively. In particular, the L1 cache is flushed into the L2 cache at block 60 and the L1 cache is placed in a low-power non-snoopable state at block 62. If the flushed data is not already in the L2 cache (which handles snoops while the L1 cache is in the non-snoopable state) the data can be further flushed to system memory. The L1 flushing feature may be used for the C3 and CC3 state. Block 64 provides for gating a dedicated clock of the core.

If all cores are ready to enter an idle state, block 66 provides for reducing a performance state of the processor. Performance states typically involve the adjustment of shared resource settings such as core voltage and/or frequency. The following table demonstrates one example of multiple performance state settings that can be used for a processor core.

TABLE II

| P-state | Frequency | Voltage |
| --- | --- | --- |
| P0 | 1.6 GHz | 1.484 V |
| P1 | 1.4 GHz | 1.420 V |
| P2 | 1.2 GHz | 1.276 V |
| P3 | 1.0 GHz | 1.164 V |
| P4 | 800 MHz | 1.036 V |
| P5 | 600 MHz | 0.956 V |

An execution context of the processor can be saved at block 70 and a shared phase locked loop (PLL) can be shutdown at block 68. In the illustrated approach, the PLL shutdown can be conducted after the chipset handshake sequence has been completed. As already noted, by initiating advanced power saving features such as these while the core is still able to execute instructions, the illustrated approach provides significant advantages over conventional techniques.

Figure 6A:
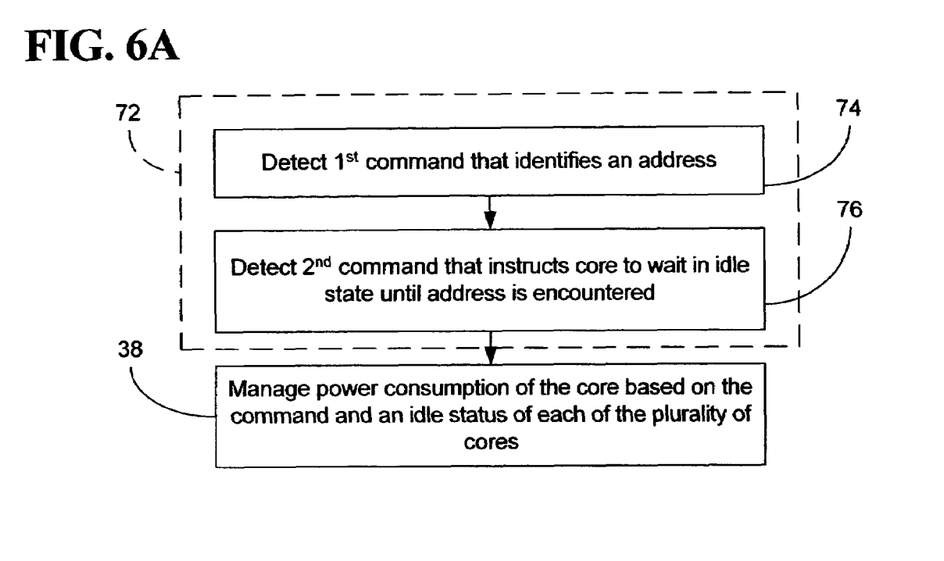
FIG. 6A is a flowchart of an example of a process of detecting a command according to one embodiment of the invention.

FIG. 6A shows one approach to detecting an idle state transition command in greater detail at block 72. Thus, block 72 can be readily substituted for block 36 (FIG. 3) discussed above. In particular, the illustrated block 76 provides for detecting a first command that identifies an address. One such command might be a MONITOR command. A second command is detected at block 76, where the second command instructs the core to wait in an idle state until the address is encountered. One such command might be an MWAIT(Cx) command, where "x" signifies the target idle state. The MWAIT approach could be implemented in a processor driver that is optimized to support multi-core operation.

Figure 6B:
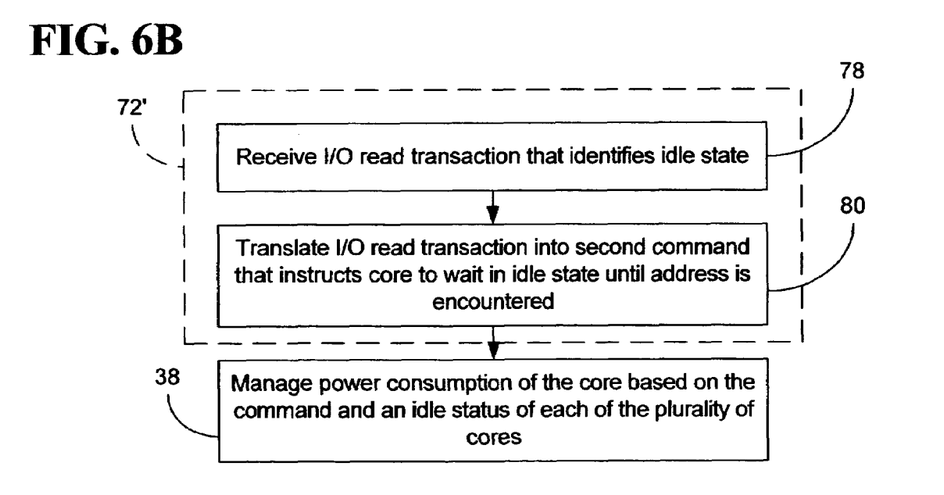
FIG. 6B is a flowchart of an example of a process of detecting a command according to an alternative embodiment of the invention.

FIG. 6B shows an alternative approach to detecting an idle state transition command in greater detail at block 72'. Thus, block 72' can be readily substituted for block 36 discussed above. In particular, the illustrated block 78 provides for receiving an I/O read transaction that identifies the idle state. One such transaction might be a Levelx_Rd transaction, where "x" signifies the target idle state. This type of command could be issued by the chipset and/or OS. Block 80 provides for translating the I/O read transaction into a second command that instructs the core to wait in the idle state until an address is encountered. Thus, the I/O read transaction could be translated into an MWAIT command.

Figure 7:
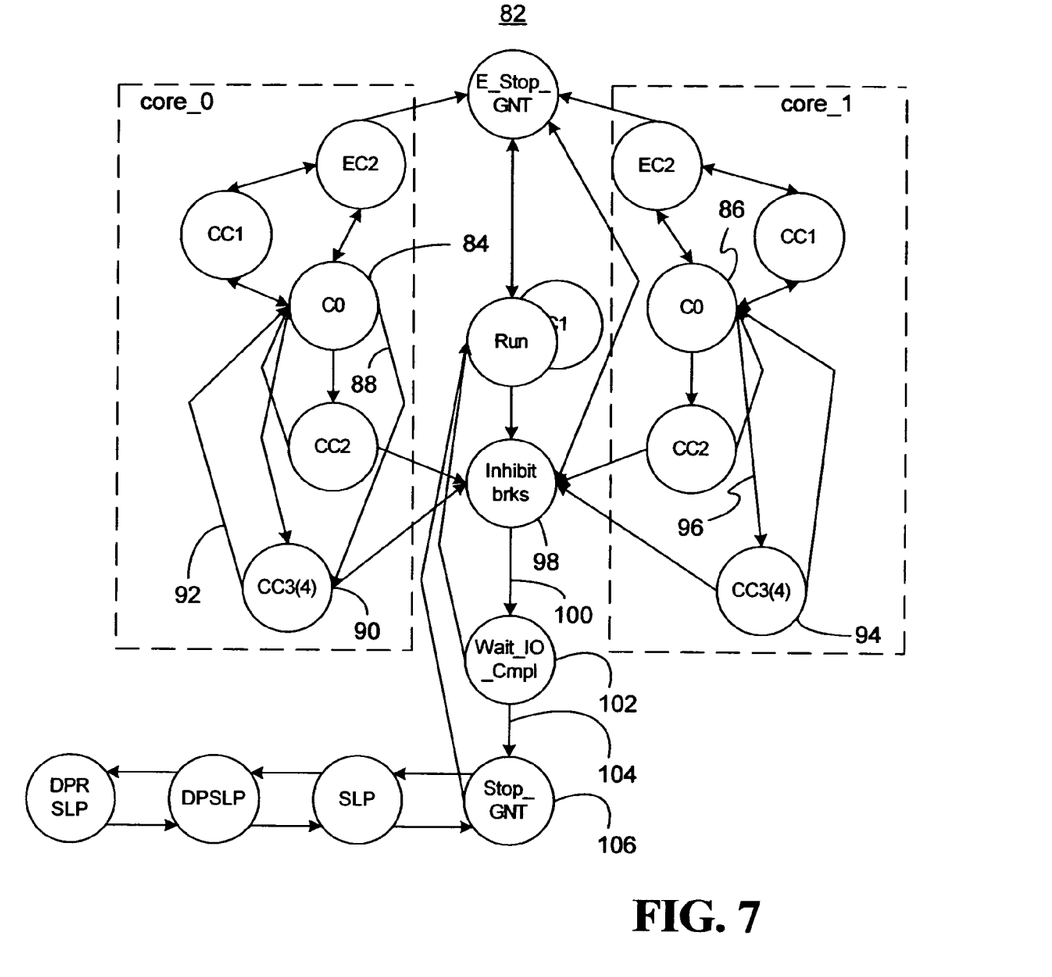
FIG. 7 is a state diagram of an example of a power management state machine according to one embodiment of the invention.

Turning now to FIG. 7, a specific example of a multi-core state machine 82 is shown. State machine 82 will be described in reference to a target state of the C4 state for the purposes of discussion. Consider, for example, a case in which both cores are in the active state C0, which is illustrated as states 84 and 86. If the first core (i.e., core_0) receives an MWAIT(C4) command (or I/O read transaction), the first core will be placed in a tentative state 90 at arrow 88. The tentative state 90 is illustrated as "CC3(C4)". The first core will initiate various dedicated power saving features such as flushing the L1 cache and gating the dedicated clock of the first core. If an interrupt or the specified MONITOR address is encountered, the first core will "break" to the active state 84 at arrow 92. While the first core is in the tentative state 90, the hardware coordination logic will monitor the second core (i.e., core_1) to detect when the second core is ready to transition to the C4 state. If the second core receives a request to transition to the C4 state while the first core is in the tentative state 90, the second core will transition to the tentative state 94 at arrow 96.

The hardware coordination logic will then determine that both cores have detected a command requesting a transition to the C4 state, and may initiate more advanced power saving features such as a performance state reduction, a shutdown of a shared PLL or a saving of an execution context of the processor. The coordination logic can also prevent external break events from reaching the cores at state 98. Once external break events have been inhibited, the coordination logic can transition both cores to the C4 state. In particular, an I/O read transaction can be issued to the chipset at arrow 100, where the cores await completion notification in state 102. Upon receipt of the chipset acknowledgment (e.g., STPCLK pin assertion) and the I/O-cycle completion notification, the coordination logic issues a stop grant signal to the chipset at arrow 104 and waits in the Stop_GNT state 106. The entire processor is then sequenced through the sleep (i.e., SLP), deep sleep (i.e., DPSLP) and deeper sleep (i.e., DPRSLP) states, where the deep sleep state and the deeper sleep states correspond to the traditional C3 and C4 states, respectively.

Thus, a number of advantages can be achieved through the various techniques described herein. For example, enabling software to initiate different idle state commands per core provides maximum flexibility and power savings. Furthermore, by internally analyzing target idle states on a per core basis (versus external-only sequencing), advanced power management activities can be initiated while clocks are available and the core(s) are still running. It should also be noted that independent idle states can be established for each core while presenting a common "shallowest" state to the chipset and other system components. The result is a highly scalable, yet sophisticated solution. Simply put, hardware coordination of idle states in a multi-core environment as discussed herein can provide substantial benefits over conventional architectures and/or techniques.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
   detecting a command at a core of a processor having a plurality of cores, the command requesting a transition of the core to an idle state; and
   managing power consumption of the core based on the command and an idle state status of each of the plurality of cores;
   wherein managing power consumption of the core includes:
      determining whether each of the plurality of cores has detected a command requesting a transition to a common state, and
      selecting a shallowest power conservation state among the plurality of cores as the idle state if each of the plurality of cores has not detected a command requesting a transition to the common state.

2. The method of claim 1, further including:
   initiating a dedicated power saving feature in the core before transitioning the core to the idle state; and
   halting execution of the core.

3. The method of claim 2, wherein managing the power consumption further includes:
   determining that none of the plurality of cores is active
   initiating a shared power saving feature before the execution is halted;
   preventing external break events from reaching the plurality of cores; and
   transitioning the plurality of cores to the idle state.

4. The method of claim 3, wherein transitioning the plurality of cores to the idle state includes issuing a signal to a chipset, the signal being selected from a group comprising a read transaction, a bus message and a sideband signal.

5. The method of claim 3, wherein initiating the shared power saving feature includes initiating a process selected from a group comprising reducing a performance state of the processor, shutting down a shared phase locked loop and saving an execution context of the processor.

6. The method of claim 2, wherein managing the power consumption further includes:
   determining that one or more of the plurality of cores is active; and
   determining whether the idle state is associated with a resource that is shared by the plurality of cores.

7. The method of claim 6, wherein managing the power consumption further includes:

transitioning the core to a tentative state until each of the plurality of cores has detected a command requesting a transition to the idle state if the idle state is associated with a resource that is shared by the plurality of cores;

transitioning the core to the idle state if the idle state is not associated with a resource that is shared by the plurality of cores.

8. The method of claim 2, wherein initiating the dedicated power saving feature includes:

flushing a level one cache of the core into a level two cache of the processor;

placing the level one cache in a non-snoopable state; and gating a dedicated clock of the core.

9. The method of claim 1, wherein the detecting includes:

detecting a first command that identifies an address; and detecting a second command that instructs the core to wait in the idle state until the address is encountered.

10. The method of claim 1, wherein the detecting includes:

receiving an input/output (I/O) read transaction that identifies the idle state; and translating the I/O read transaction into a second command that instructs the core to wait in the idle state until an address is encountered.

11. An apparatus comprising:

a processor having a plurality of cores, the plurality of cores including a core to detect a command that requests a transition of the core to an idle state, the processor having hardware coordination logic to manage power consumption of the core based on the command and an idle state status of each of the plurality of cores, wherein the coordination logic is to determine whether each of the plurality of cores has detected a command requesting a transition to a common state and select a shallowest state among the plurality of cores as the idle state if each of the plurality of cores has not detected a command requesting a transition to the common state.

12. The apparatus of claim 11, wherein the core is to initiate a dedicated power saving feature in the core before the core is transitioned to the idle state, and halt execution of the core.

13. The apparatus of claim 12, wherein the coordination logic is to determine that none of the plurality of cores is active, initiate a shared power saving feature before the execution is halted, prevent external break events from reaching the plurality of cores and transition the plurality of cores to the idle state.

14. The apparatus of claim 13, wherein the coordination logic is to issue a signal to a chipset to transition the plurality of cores to the idle state, the signal to be selected from a group comprising a read transaction, a bus message and a sideband signal.

15. The apparatus of claim 13, wherein the coordination logic is to initiate a process selected from a group comprising reducing a performance state of the processor, shutting down a shared phase locked loop or saving an execution context of the processor to initiate the shared power saving feature.

16. The apparatus of claim 12, wherein the coordination logic is to determine that one or more of the plurality of cores is active and determine whether the idle state is associated with a resource that is shared by the plurality of cores.

17. The apparatus of claim 16, further including a resource that is shared by the plurality of cores, the core to transition itself to a tentative state until each of the plurality of cores has detected a command requesting a transition to the idle state if the idle state is associated with the resource and transition itself to the idle state if the idle state is not associated with the resource.

18. The apparatus of claim 12, further including:

a level one cache that is dedicated to the core a level two cache that is shared by the piurality of cores; and a clock that is dedicated to the core, the core to flush the level one cache into the level two cache, place the level one cache in a non-snoopable state and gate the clock.

19. The apparatus of claim 11, wherein the core is to detect a first command that identifies an address and detect a second command that instructs the core to wait in the idle state until the address is encountered.

20. apparatus of claim 11, wherein the core is to receive an input/output (I/O) read transaction that identifies the idle state and translate the I/O read transaction into a second command that instructs the core to wait in the idle state until an address is encountered.

21. A system comprising:

a random access memory to store instructions; and a processor having a plurality of cores to execute the instructions, the plurality of cores including a core to detect a command that requests a transition of the core to an idle state, the processor having hardware coordination logic to manage power consumption of the core based on the command and an idle status of each of the plurality of cores, wherein the coordination logic is to determine whether each of the plurality of cores has detected a command requesting a transition to a common state and select a shallowest state among the plurality of cores as the idle state if each of the plurality of cores has not detected a command requesting a transition to the common state.

22. The system of claim 21, wherein the core is to initiate a dedicated power saving feature in the core before the core is transitioned to the idle state, and halt execution of the core.

23. The system of claim 22, wherein the coordination logic is to determine that none of the plurality of cores is active, initiate a shared power saving feature before the execution is halted, prevent external break events from reaching the plurality of cores and transition the plurality of cores to the idle state.

24. The system of claim 23, further including a chipset disposed between the processor and the memory, the coordination logic to issue a signal to the chipset to transition the plurality of cores to the idle state, the signal to be selected from a group comprising a read transaction, a bus message and a sideband signal.

25. The system of claim 21, wherein the core is to detect a command that requests a transition of the core to a C-state.

26. A method comprising:

detecting a command at a core of a processor having a plurality of cores, the command requesting a transition of the core to a C-state;

initiating a dedicated power saving feature in the core before transitioning the core to the C-state;

determining whether each of the plurality of the cores is active;

if none of the plurality of cores is active, determining whether each of the plurality of cores has detected a command requesting a transition to a common state, and selecting a shallowest state among the plurality of cores as the C-state if each of the plurality of cores has not detected a command requesting a transition to the common state;

if one or more of the plurality of cores is active, determining whether the C-state is associated with a resource that is shared by the plurality of cores;

if the C-state is associated with a resource that is shared by the plurality of cores, transitioning the core to a tentative state until each of the plurality of cores has detected a command requesting a transition to the C-state;

if the C-state is not associated with a resource that is shared by the plurality of cores, transitioning the core to the C-state; and halting execution of the core.

27. The method of claim 26, wherein initiating the dedicated power saving feature includes:

flushing a level one cache of the core into a level two cache of the processor;

placing the level one cache in a non-snoopable state; and gating a dedicated clock of the core.

28. The method of claim 26, wherein if none of the plurality of cores is active the method further includes:

initiating a shared power saving feature, preventing external break events from reaching the plurality of cores and transitioning the plurality of cores to the C-state.

29. The method of claim 26, wherein initiating the shared power saving feature includes initiating a process selected from a group comprising reducing a performance state of the processor, shutting down a phase locked loop and saving an execution context of the processor.

* * * * *

UNITED STATES PATENT AND TRADEMARK OFFICE
CERTIFICATE OF CORRECTION

PATENT NO.        : 7,451,333 B2                                    Page 1 of 1
APPLICATION NO.   : 10/934034
DATED             : November 11, 2008
INVENTOR(S)       : Naveh et al.

It is certified that error appears in the above-identified patent and that said Letters Patent is hereby corrected as shown below:

In column 8, at line 3 delete "piurality" and insert --plurality--.

Signed and Sealed this

Eighth Day of December, 2009

David J. Kappos
*Director of the United States Patent and Trademark Office*